(12) United States Patent
O'Brien

(10) Patent No.: US 11,923,143 B2
(45) Date of Patent: Mar. 5, 2024

(54) CAPACITIVE CABLE

(71) Applicant: Enertechnos Limited, Surrey (GB)

(72) Inventor: Gareth O'Brien, County Meath (IE)

(73) Assignee: Enertechnos Limited, Surrey (GB)

(*) Notice: Subject to any disclaimer, the term of this patent is extended or adjusted under 35 U.S.C. 154(b) by 28 days.

(21) Appl. No.: 17/413,618

(22) PCT Filed: Nov. 29, 2019

(86) PCT No.: PCT/GB2019/053389
§ 371 (c)(1),
(2) Date: Jun. 14, 2021

(87) PCT Pub. No.: WO2020/120932
PCT Pub. Date: Jun. 18, 2020

(65) Prior Publication Data
US 2022/0076885 A1    Mar. 10, 2022

(30) Foreign Application Priority Data
Dec. 14, 2018 (GB) ..................................... 1820378

(51) Int. Cl.
*H01G 4/012* (2006.01)
*H01B 7/08* (2006.01)
*H01G 4/26* (2006.01)

(52) U.S. Cl.
CPC ........... *H01G 4/012* (2013.01); *H01B 7/0869* (2013.01); *H01G 4/26* (2013.01)

(58) Field of Classification Search
CPC .......... H01G 4/012; H01G 4/26; H01B 7/0869
See application file for complete search history.

(56) References Cited

U.S. PATENT DOCUMENTS 4,127,891 A    11/1978    Rayburn
4,325,526 A *   4/1982    Kitagawa ................. F16L 3/23
                                                                    24/336

(Continued)

FOREIGN PATENT DOCUMENTS

CN    205 508 493 U    8/2016
WO    2010/026380 A1    3/2010

OTHER PUBLICATIONS

Anonymous: "Capacitative transfer promises significant reduction in losses—Modern Power Systems", May 15, 2018, XP055617970, URL: https://www.modernpowersystems.com/features/featurecapacitative-transfer-promises-significant-reduction-in-losses-6150871/.

(Continued)

*Primary Examiner* — Michael P McFadden
(74) *Attorney, Agent, or Firm* — Bay State IP, LLC

(57) ABSTRACT

A capacitive cable comprised six long, thin and narrow electrode plates or strips (101, 102, 103, 104, 105, 106). Typically, they are 5 km long, 10 cm wide and 0.5 mm thick of aluminum or copper foil. Individual ones of them are separated by 0.25 mm thick polypropylene ribbons (107) insulating the individual strips from each other in an insulating manner. The assembly of strips and ribbons is contained within an insulating sheath 108. At opposite ends (111,112), the alternate strips are cut off short and the remaining fingers (114,115) are joined together and to connection wires (116,117), typically by riveting (118). The wires are insulated and the insulating sheath extends onto the insulation of the wires, whereby the entire cable is insulated for safe contact with foreign objects between the ends.

8 Claims, 4 Drawing Sheets

(56) References Cited

U.S. PATENT DOCUMENTS

| | | | | |
|---|---|---|---|---|
| 4,325,600 A | * | 4/1982 | Nestor | H01R 4/60 |
| | | | | 439/523 |
| 4,477,769 A | * | 10/1984 | Lowery | G01R 31/59 |
| | | | | 324/517 |
| 4,635,886 A | * | 1/1987 | Santucci | F16L 3/12 |
| | | | | 248/74.1 |
| 4,687,882 A | * | 8/1987 | Stone | H01B 9/027 |
| | | | | 174/106 SC |
| 4,712,162 A | | 12/1987 | Quiogue | |
| 5,160,812 A | * | 11/1992 | Takahashi | F16L 3/08 |
| | | | | 174/72 A |
| 5,558,794 A | * | 9/1996 | Jansens | H05B 3/56 |
| | | | | 219/505 |
| 2002/0015277 A1 | | 2/2002 | Nitoh | |
| 2010/0098425 A1 | * | 4/2010 | Kewitsch | G02B 6/562 |
| | | | | 398/116 |
| 2015/0192618 A1 | * | 7/2015 | Juds | G01R 15/16 |
| | | | | 324/76.11 |
| 2016/0049240 A1 | * | 2/2016 | Kato | H01G 4/14 |
| | | | | 361/748 |
| 2017/0063064 A1 | * | 3/2017 | Gintz | H02G 3/305 |

OTHER PUBLICATIONS

International Search Report, European Patent Office, dated Mar. 11, 2020.
Written Opinion of the International Searching Authority, European Patent Office, dated Mar. 11, 2020.

* cited by examiner

CAPACITIVE CABLE

CROSS REFERENCE TO RELATED APPLICATION

This application is for entry into the U.S. National Phase under § 371 for International Application No. PCT/GB2019/053389 having an international filing date of Nov. 29, 2019, and from which priority is claimed under all applicable sections of Title 35 of the United States Code including, but not limited to, Sections 120, 363, and 365(c) and which in turn claims priority under 35 USC 119 to Great Britain Patent Application No. 1820378.6 filed on Dec. 14, 2018.

The present invention relates to a capacitive cable.

Figure 1:
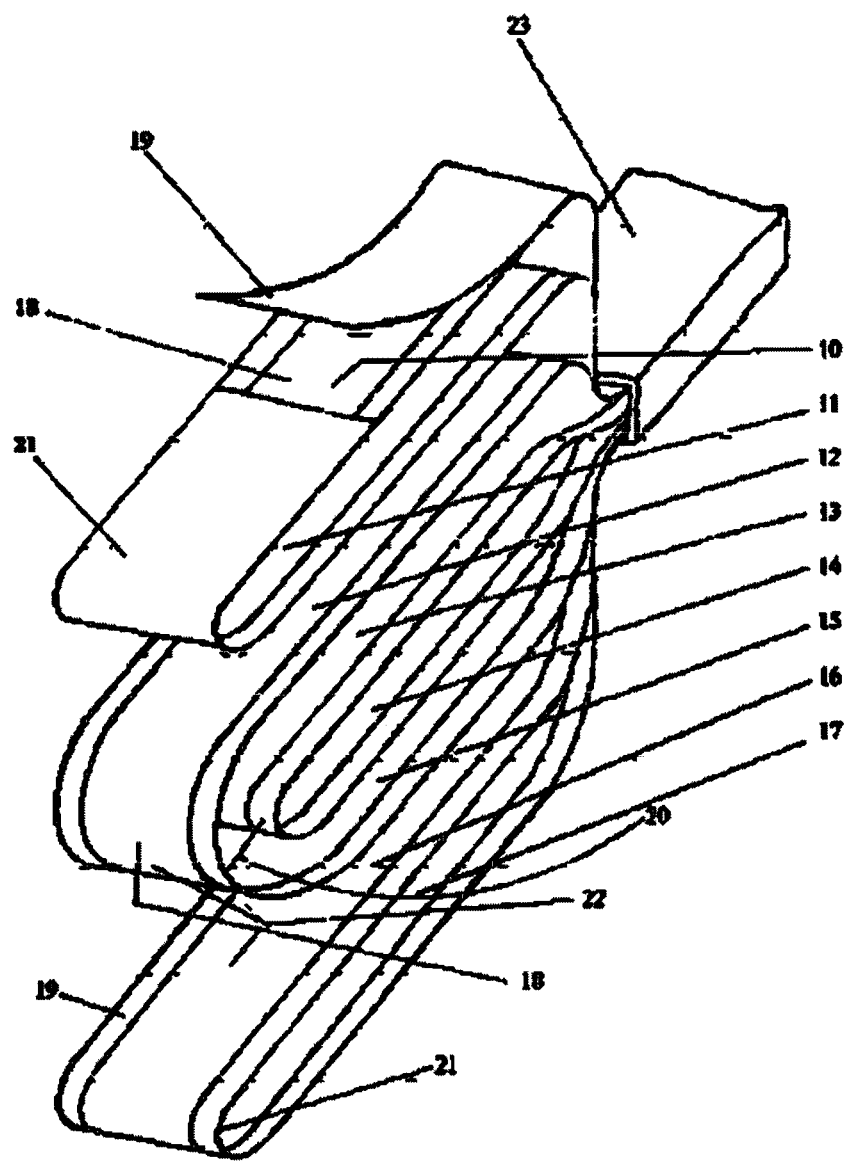

In WO 2010/026380 there is described, in terms of its abstract and with reference to FIG. 1 hereof:

A charge transfer zero loss power and signal transmission cable comprising, eight lengths of an electric conducting material (18), being layered in alignment, one on top of the other, each of which can be electrically jointed to give any required length. Each of the conductive layers is separated from each other by alternate layers of a dielectric material (19). The conductive layers (10-17) are formed into a charging folded closed loop (20) and a discharging folded closed loop (21) with the apex of the fold (22) of each folded closed loops in opposition to each other, being the ends of the cable, are separated from each other by a dielectric material (19), thereby making capacitive contact and is the means to transfer an electric charge from the said charging loop to the discharging loop, thereby transmitting an alternating current from a power supply to a point of transmission, with substantially zero resistance, by the said two charging and discharging loops, thereby transmitting power from a power supply over a given distance, to a point of transmission with zero power loss.

It is surprising that such a capacitive cable is capable of transmitting data and/or power over a long distance with low, if not completely zero loss. Our initial tests have confirmed this.

For this cable, the loop formation is taught to be essential. We believe that the loop formation is not essential.

The object of the present invention is to provide an improved capacitive cable

According to one aspect of the invention there is provided a capacitive cable comprising:
- at least two elongate electrode plates of one polarity, these plates being inter-connected at one end of the cable;
- at least two elongate electrode plates of another polarity, these plates being:
  - interdigitated with the plates of the one polarity and being
  - interconnected at the other end of the cable; and
- dielectric material between the interdigitated plates.

To retain the plates close to each other for maintained capacitance, they can be housed between resilient binding members which have a free curvature away from the plates and which are held together along their edges. This flattens them and applies pressure across the area of the plates pressing the plates in towards each other.

The bound plates can be encased in an outer casing, either individually or collectively where they form a multi-phase cable. The individual cables can be placed flat on top of each other, i.e. being arranged parallel to each other. Alternatively, they can radiate from a central axis. Divergent spacers between them. The spacers can be circular cylindrical in shape, squeezed to divergent shape. Again they can be individual 120° divergent plastics material extrusion or a single 360° extrusion with flat cable slots set at 120°.

The cable can have a central earth wire or preferably an outer casing of helically arranged earth wires.

We also envisage that cables in accordance with WO 2010/026380 could be arranged diverging from a central axis in like manner.

Figure 2:
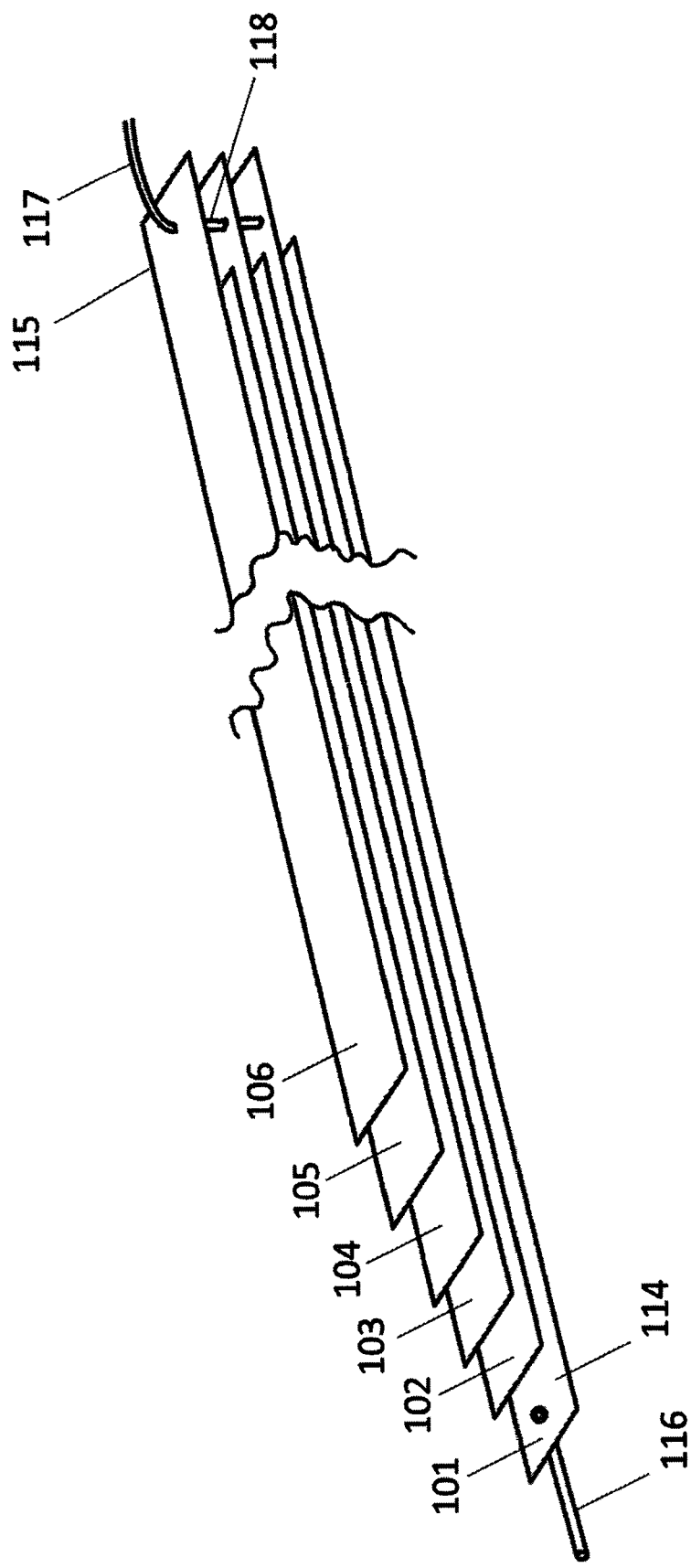
Figure 3:
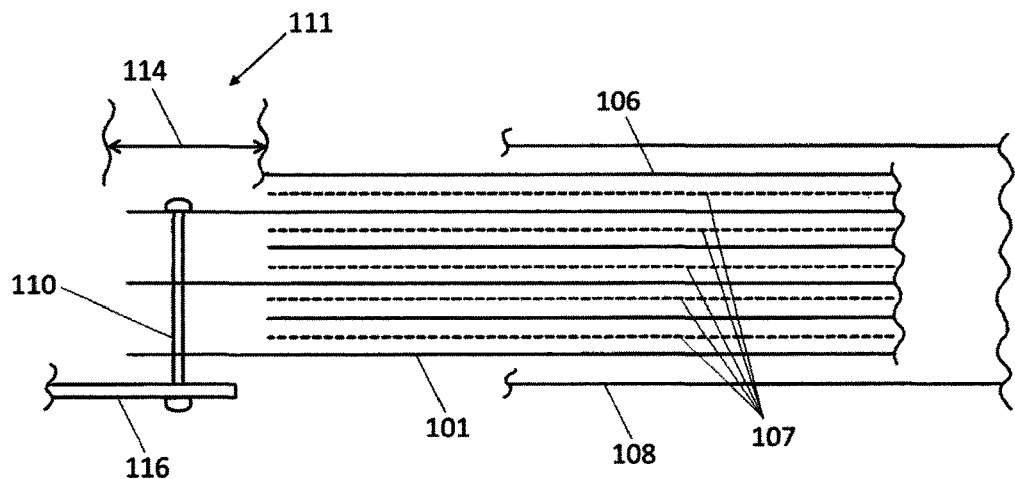
Figure 4:
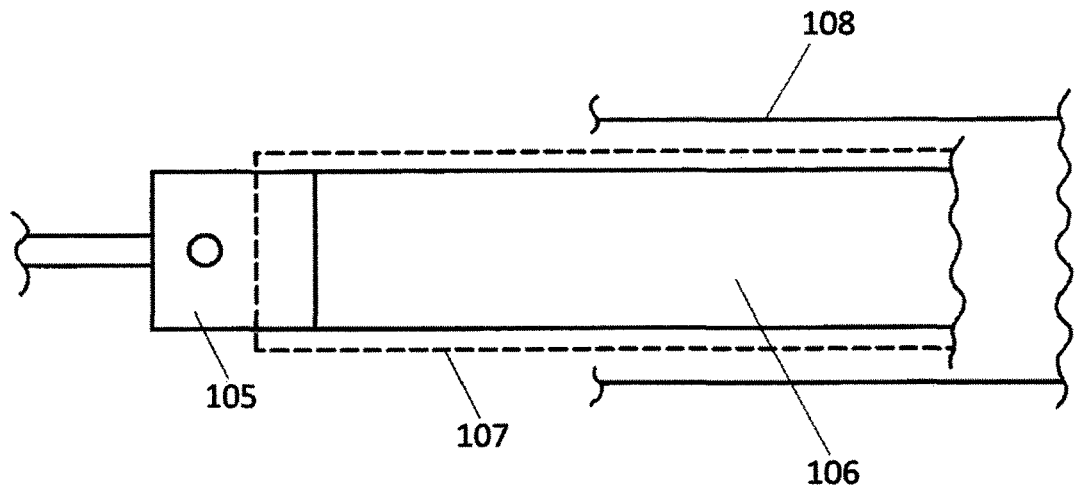
Figure 5:
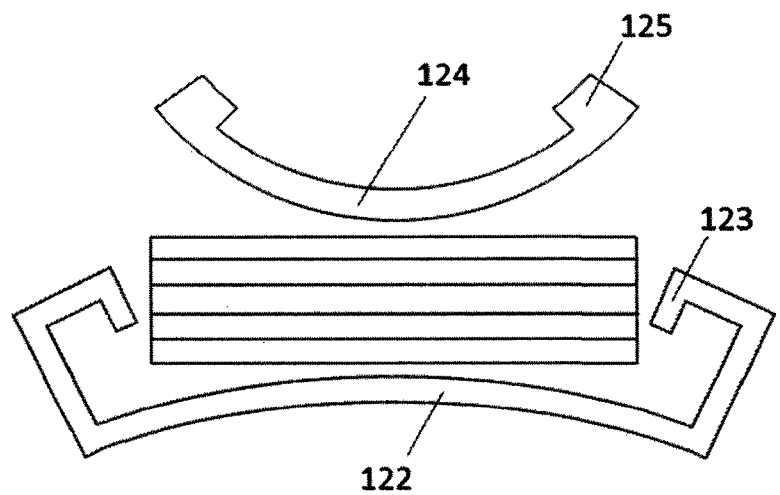
Figure 6:
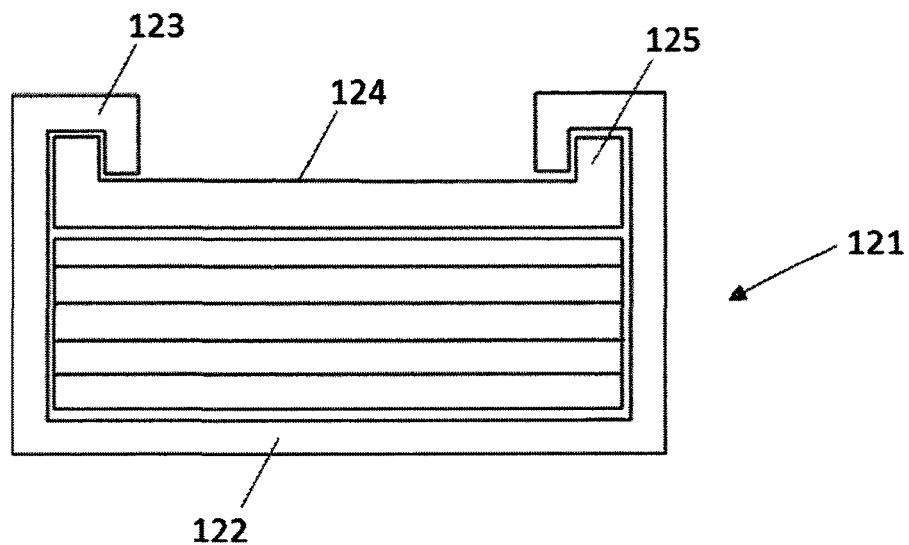
Figure 7:
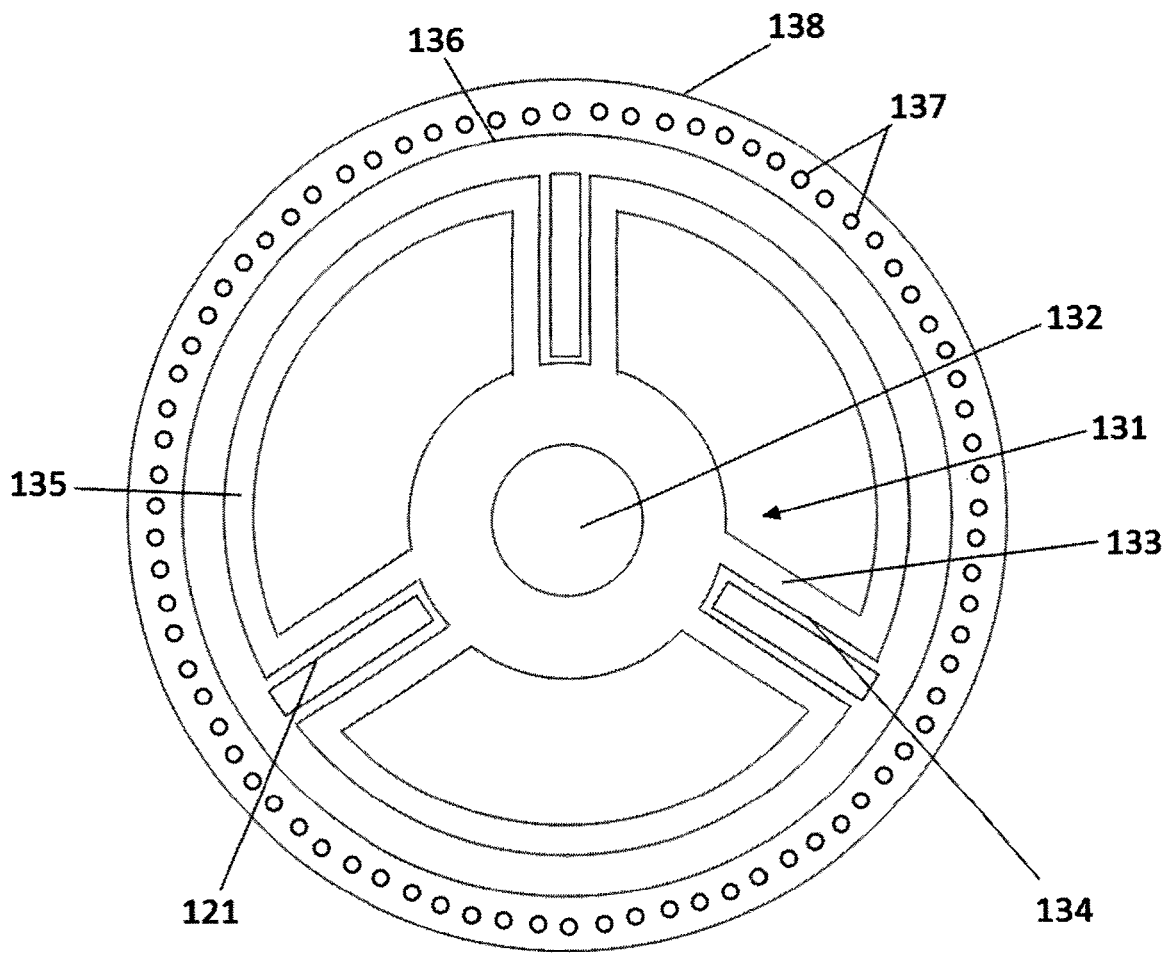

To help understanding of the invention, a specific embodiment thereof will now be described by way of example and with reference to the accompanying drawings, in which:

FIG. 1 is FIG. 1 of WO 2010/026380,

FIG. 2 is a perspective, broken view of the plates at both ends of a capacitive cable of indefinite length in accordance with the invention, FIG. 3 is a cross-sectional side view of one end of the cable of FIG. 2, FIG. 4 is a plan view of the one end of the cable of FIG. 2, FIG. 5 is a cross-sectional end view of the cable of FIG. 2 in position to be closed in a sheath comprising a trough and a cover, which are outwardly concave, FIG. 6 is a view similar to FIG. 5, showing the sheath closed, FIG. 7 is a similar cross-sectional view of three cables in a tri-radial carrier having an armoured casing.

Referring to FIGS. 2 to 4 of the drawings, the cable thereshown is comprised of six long, thin and narrow electrode plates or strips 101, 102, 103, 104, 105, 106. Typically they are 5 km long, 10 cm wide and 0.5 mm thick of aluminium or copper foil. Individual ones of them are separated by 0.25 mm thick polypropylene ribbons 107 insulating the individual strips from each other in an insulating manner. The assembly of strips and ribbons is contained within an insulating sheath 108.

At opposite ends 111,112, the alternate strips are cut off short and the remaining fingers 114,115 are joined together and to connection wires 116,117, typically by riveting 118. The wires are insulated and the insulating sheath extends onto the insulation of the wires, whereby the entire cable is insulated for safe contact with foreign objects between the ends.

To maintain the electrode strips in contact with their separation ribbons, the cable, including the insulation sheath is held within an outer sleeve 121 made up of shallow channel-shaped trough 122 with over-hanging rims 123 and a closure tongue 124 with up-standing lips 125. The trough and the tongue of the sleeve are or plastics material extrusions, moulded with outwardly concave curvature. For use, with the cable in the trough, the tongue is pushed into the trough, with both being flattened. The lips 125 engage under the rims, holding the curvature flattened and applying pressure to hold the strips against dielectric ribbons and the capacitance of the cable high.

For a single phase supply, two pairs of cables are required. They can be bound together flat and edge-to-edge within an earth screen. The edge to edge arrangement mitigates against capacitive interference between cables. Alternatively they can be laid against the opposite sides of a hollow square extrusion of dielectric material, again to mitigate interference and again within an earth screen.

For three phases, the arrangement of FIG. 7 can be used. A "tri-radial" plastics material extrusion 131 has a small central tube 132, from which radiate three pairs of webs 133, leaving between them radial slots 134 of a size to accommodate a cable within its outer sleeve 121. Circularly shaped flanges 135 extend between neighbouring webs 133 between adjacent slots 134.

With three cable cables accommodated, a wrapping 136 secures them. Around this earthing, armouring of steel wires 137 is wound followed by an external waterproof sheath 138.

We envisage the following typical parameters for our cables:

- Lengths—between 1 km and 1000 km, usually between 1 km and 100 km.
- Widths—between 50 mm and 150 mm
- Combined Thickness (Foil and Dielectric)—up to 10 mm
- No of plates—between 8 and 30
- Plate thickness up to 0.1 mm
- Plate material—Aluminium or Copper
- Dielectric thickness—up to 0.5 mm
- Dielectric material—Polypropylene
- Capacitance—80 microF per km
- Power capacity—0.5 to 5 GVA The invention is not intended to be restricted to the details of the above described embodiments. For instance:

The first embodiment can in place of the trough 122 and tongue 124 have two concave tongues and two U-shaped extrusions clipped onto the edges of the tongues to urge them against the strip and ribbon assembly;

The second embodiment can have an earth wire may be incorporated in a central tube 130 of the tri-radial moulding, with the armouring of the cable being polymeric. Further the voids between the radial webs 133 may be filled with material to urge the plates into close capacitive contact.

The invention claimed is:

1. A multi-phase cable comprising a plurality of capacitive cables, wherein each capacitive cable comprises:
   at least two elongate electrode plates of one polarity, these plates being inter-connected at one end of the cable;
   at least two elongate electrode plates of another polarity, these plates being:
      interdigitated with the plates of the one polarity and being
      interconnected at the other end of the cable; and
   dielectric material between the interdigitated plates,
   wherein the plates are collectively encased in an outer casing or sheath, and
   wherein the individual capacitive cables are arranged to radiate from a central axis, forming radiating capacitive cables.

2. The multi-phase cable of claim 1, including divergent spacers between the radiating capacitive cables.

3. The multi-phase cable of claim 2, wherein the divergent spacers are circular cylindrical in shape, squeezed to divergent shape when in place.

4. The multi-phase cable of claim 2, wherein the divergent spacers are individual 120° divergent plastics material extrusions or a single 360° extrusion with flat cable slots set at 120°.

5. The multi-phase cable of claim 2, including a central earth wire and/or an outer casing of helically arranged earth wires.

6. A capacitive cable comprising:
   at least two elongate electrode plates of one polarity, these plates being inter-connected at one end of the cable;
   at least two elongate electrode plates of another polarity, these plates being:
      interdigitated with the plates of the one polarity and being
      interconnected at the other end of the cable; and
   dielectric material between the interdigitated plates,
   wherein the capacitive cable is at least 1 km in length.

7. The capacitive cable of claim 6, wherein the interdigitated plates are housed between resilient binding members, to retain the plates close to each other for maintained capacitance.

8. The capacitive cable of claim 3, wherein the resilient binding members have a free curvature away from the plates, whereby the binding members are flattened when interengaged and apply pressure across the area of the plates pressing them in towards each other.

* * * * *